United States Patent
Inoue

(10) Patent No.: US 11,345,026 B2
(45) Date of Patent: May 31, 2022

(54) ROBOT PROGRAM GENERATION APPARATUS

(71) Applicant: FANUC CORPORATION, Yamanashi (JP)

(72) Inventor: Kozo Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 307 days.

(21) Appl. No.: 16/446,631

(22) Filed: Jun. 20, 2019

(65) Prior Publication Data
US 2020/0009724 A1 Jan. 9, 2020

(30) Foreign Application Priority Data
Jul. 6, 2018 (JP) .............................. JP2018-129338

(51) Int. Cl.
*B25J 9/16* (2006.01)

(52) U.S. Cl.
CPC ........... *B25J 9/1605* (2013.01); *B25J 9/1656* (2013.01); *B25J 9/1658* (2013.01); *B25J 9/1664* (2013.01); *B25J 9/1671* (2013.01)

(58) Field of Classification Search
CPC ...... B25J 9/1605; B25J 9/1671; B25J 9/1658; B25J 9/1656; B25J 9/1661; G05B 2219/40323; G05B 2219/40392; G05B 2219/40548; G05B 2219/40515
See application file for complete search history.

(56) References Cited

U.S. PATENT DOCUMENTS

| 6,470,301 | B1 * | 10/2002 | Barral | G05B 19/41885 703/1 |
| 9,724,826 | B1 * | 8/2017 | Prats | B25J 9/1664 |
| 2009/0069939 | A1 * | 3/2009 | Nagatsuka | G05B 19/4069 700/258 |
| 2010/0241248 | A1 * | 9/2010 | Zhang | G05B 19/41885 700/29 |
| 2016/0096269 | A1 * | 4/2016 | Atohira | B25J 9/1687 700/264 |
| 2016/0199981 | A1 * | 7/2016 | Atohira | B25J 9/1605 700/248 |

(Continued)

FOREIGN PATENT DOCUMENTS

| DE | 60025683 T2 | 7/2006 |
| EP | 1798616 A2 | 6/2007 |

(Continued)

*Primary Examiner* — Khoi H Tran
*Assistant Examiner* — Tanner L Cullen
(74) *Attorney, Agent, or Firm* — Hauptman Ham, LLP

(57) ABSTRACT

A robot program generation apparatus that selects a typical arrangement pattern of a robot system; selects elements to be arranged in the arrangement pattern; automatically generates a layout where the elements in a stationary state do not interfere with each other; automatically generates a robot program in accordance with task details corresponding to the arrangement pattern and with the layout; executes the robot program in a virtual environment and automatically modifies installation positions of the elements in the layout based on whether or not the robot in an operating state interfere with any other elements and on whether or not the robot can reach a workpiece; and corrects the robot program based on the installation positions.

3 Claims, 11 Drawing Sheets

(56) References Cited

U.S. PATENT DOCUMENTS

2018/0036882 A1\* 2/2018 Kimura .................. B25J 9/1664
2018/0085927 A1\* 3/2018 Kapoor .................. A47L 11/24

FOREIGN PATENT DOCUMENTS

| EP | 1842631 | B1 | | 11/2008 | | |
|----|---------|-----|---|---------|---|---|
| EP | 1749621 | B1 | | 1/2014 | | |
| JP | 2001105359 | A | | 4/2001 | | |
| JP | 2005-148789 | A | | 6/2005 | | |
| JP | 200738366 | A | | 2/2007 | | |
| JP | 2007160486 | A | | 6/2007 | | |
| JP | 2008-15683 | A | | 1/2008 | | |
| JP | 2010089218 | A | \* | 4/2010 | .............. | Y02P 90/02 |
| JP | 201674063 | A | | 5/2016 | | |
| JP | 2017213644 | A | | 12/2017 | | |
| JP | 2017213644 | A | \* | 12/2017 | ................ | B25J 9/22 |
| WO | 2007113112 | A1 | | 10/2007 | | |
| WO | WO-2007113112 | A1 | \* | 10/2007 | ............ | B25J 9/1671 |
| WO | WO-2016186060 | A1 | \* | 11/2016 | ............ | B25J 13/00 |
| WO | WO-2019233484 | A1 | \* | 12/2019 | ............ | G06Q 50/28 |

\* cited by examiner

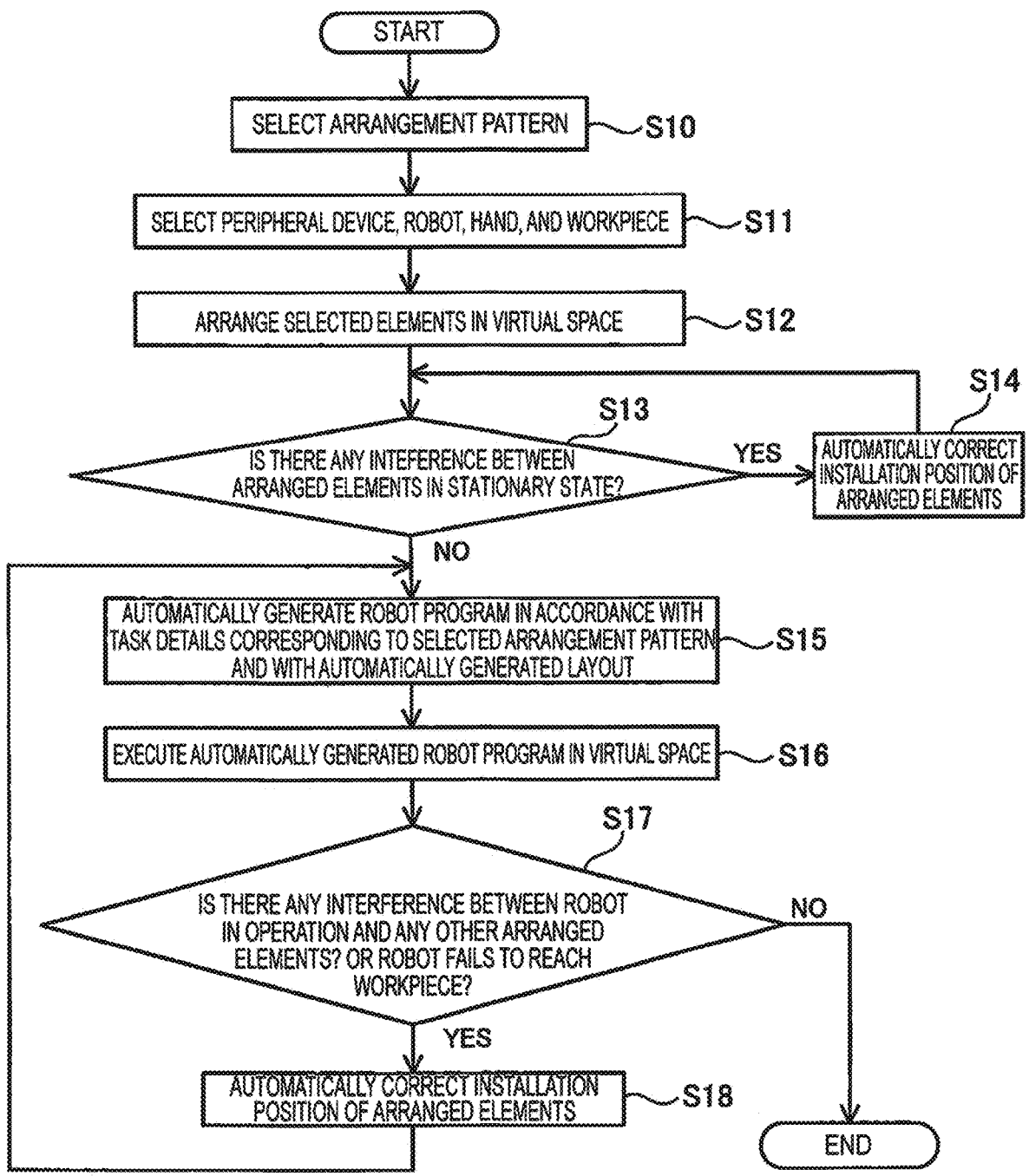

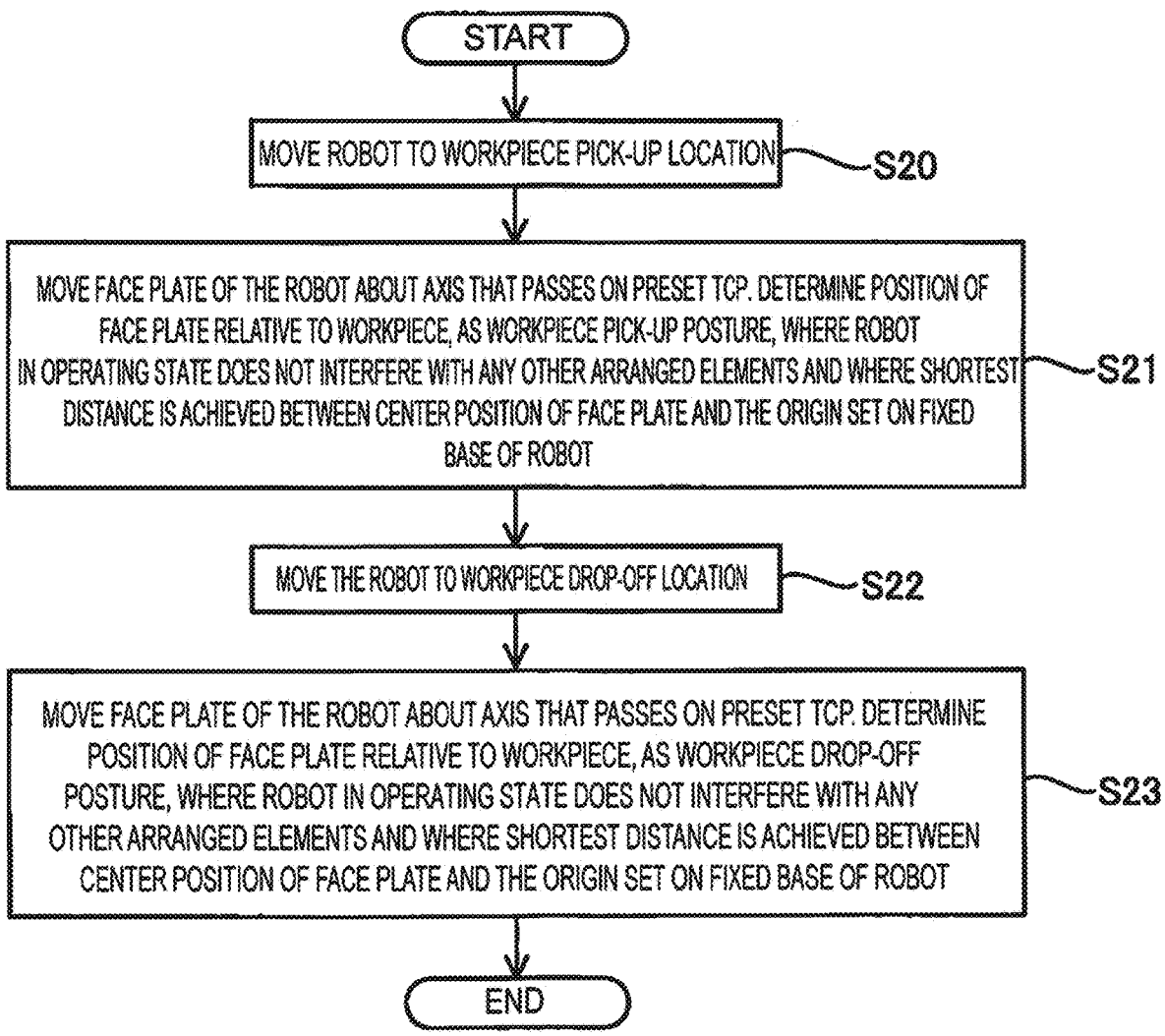

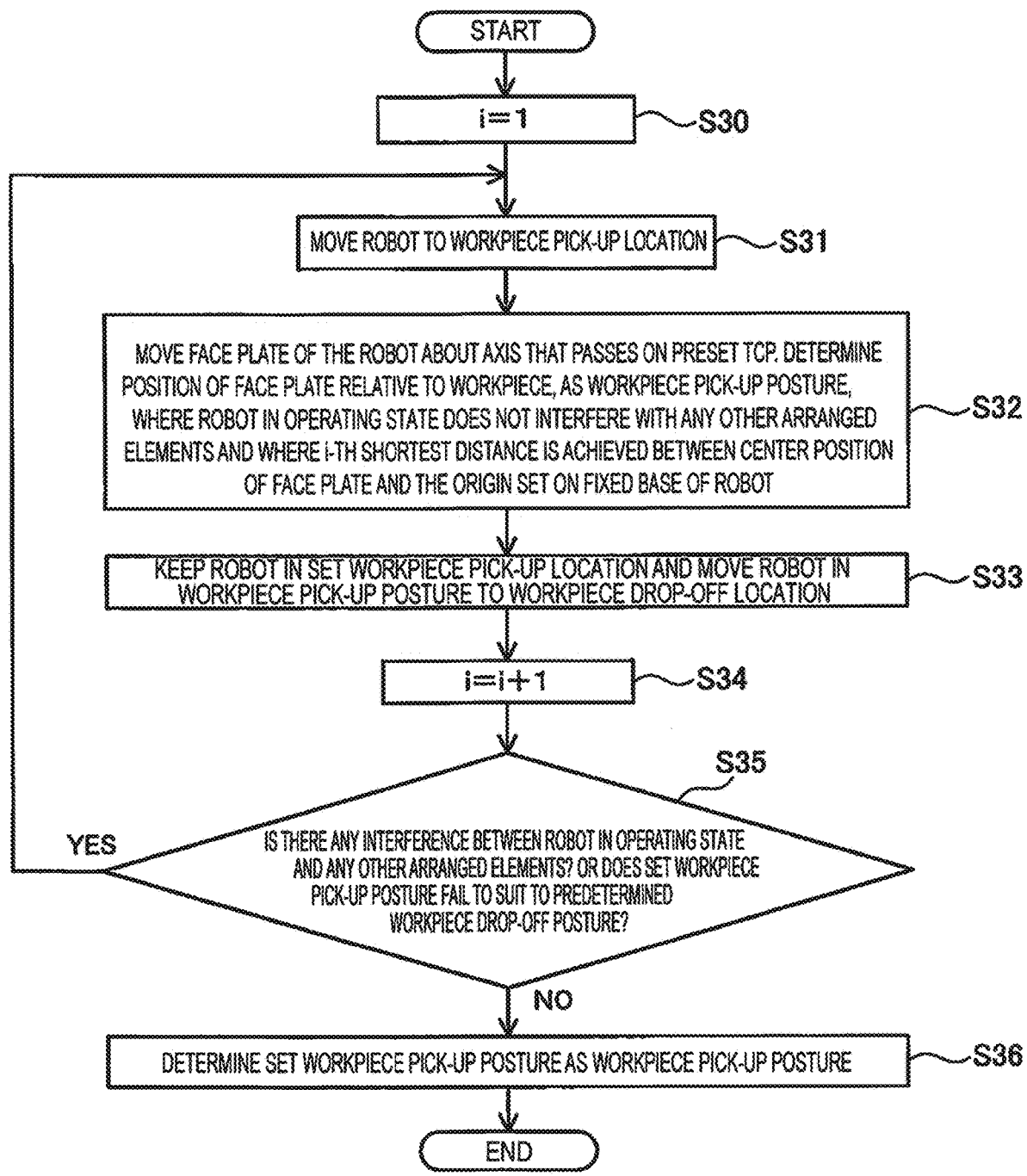

ROBOT PROGRAM GENERATION APPARATUS

RELATED APPLICATIONS

The present application claims priority of Japanese Application Number 2018-129338, filed Jul. 6, 2018, the disclosure of which is hereby incorporated by reference herein in its entirety.

BACKGROUND OF THE INVENTION

1. Field of the Invention

The present invention relates to a robot program generation apparatus, and particularly relates to a robot program generation apparatus for a robot system that includes at least a robot and a peripheral device.

2. Description of the Related Art

Offline programming requires the layout creation, the program creation, and the simulation of the robot system. To perform these things needs a lot of knowledge of programming, simulation apparatuses, and robotics. Therefore, a large amount of time is required to perform the final simulation. Various techniques to reduce the man-hour for simulation have been disclosed thus far.

JP 2005-148789 A discloses a robot teaching program editing apparatus. The following things are defined in advance by the program editing apparatus: a template of a work cell where a robot, a workpiece, a peripheral device, and the like are temporarily arranged; a template of robot task instruction; and a robot operation command associated with an object to be arranged. When a task instruction is input by voice in accordance with the sentence patterns of the template of the robot task instruction, a robot operation command associated with the object to be arranged is displayed, and a robot operation is displayed on the screen.

JP 2008-015683 A discloses a robot programming apparatus. The robot programming apparatus stores three-dimensional shape data of a hand whose shape feature conforms to a new workpiece to the highest degree. Hence, an optimal operation program to carry the new work can be prepared easily and reliably with a small number of man-hours.

SUMMARY OF THE INVENTION

The type and the layout of the elements to be arranged in the work cell (arranged elements, for short) vary depending, for instance, on the request of the user who wants to introduce the robot system, and on the environment where the robot system is to be introduced. In addition, the layout needs to be prepared taking into consideration, how to prevent the arranged elements in a stationary state from interfering with each other and how to prevent the robot in an operating state from interfering any other arranged elements. In other words, the layout is affected by various factors, such as: installation positions and sizes of the arranged elements; task details and motion ranges of the robot corresponding to the arrangement pattern; and the position and posture of the robot in relation to the workpiece. Since the layout and the robot program thus affect each other, the simulation requires a lot of man-hours.

Hence, there is a need for a technique to instantly generate a robot program for typical arrangement patterns by simple operations on the screen.

An aspect of the present disclosure provides a robot program generation apparatus for a robot system including at least a robot and a peripheral device, the robot program generation apparatus including: means for selecting a typical arrangement pattern of the robot system; means for individually selecting elements to be arranged in the selected arrangement pattern; means for automatically generating a layout where the arranged elements in a stationary state do not interfere with each other; means for automatically generating a robot program in accordance with task details corresponding to the selected arrangement pattern and with the automatically generated layout; means for executing the automatically generated robot program in a virtual environment, and automatically modifying installation positions of the arranged elements in the automatically generated layout based on whether or not the robot in an operating state interfere with any other arranged elements and on whether or not the robot can reach a workpiece; and means for correcting the robot program based on the automatically modified installation positions.

BRIEF DESCRIPTION OF THE DRAWINGS

FIG. 3 is a flowchart of robot program generation software according to one embodiment.

FIG. 6 is a flowchart illustrating a procedure for determining a workpiece pick-up posture and a workpiece drop-off posture according to one embodiment.

FIG. 8 is a flowchart illustrating a procedure for determining a workpiece pick-up posture and a workpiece drop-off posture according to the other embodiment.

DETAILED DESCRIPTION

Figure 1:
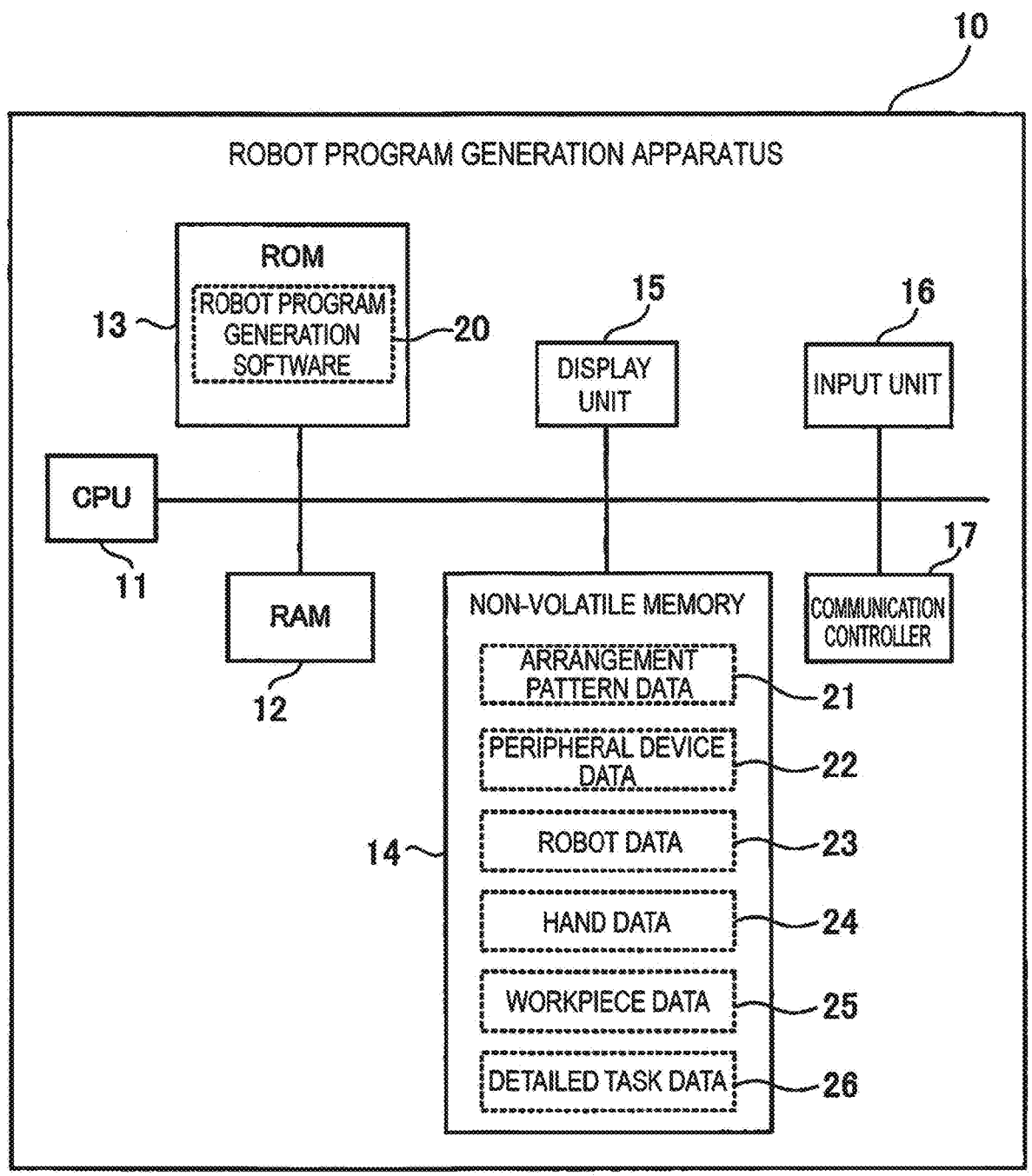
FIG. 1 is a block diagram illustrating a robot program generation apparatus according to one embodiment.

Embodiments of the present disclosure will be described in detail below with reference to the accompanying drawings. In the drawings, identical or similar elements are given identical or similar reference signs. Additionally, the embodiments described below are not intended to limit the technical scope of the invention or the meaning of terms set forth in the claims.

FIG. 1 is a block diagram illustrating a robot program generation apparatus 10 according to the present embodiment. The robot program generation apparatus 10 includes a known computer that includes at least a CPU 11, a RAM 12, a ROM 13, a non-volatile memory 14, a display unit 15, an input unit. 16, and a communication controller 17. The ROM 13 holds pre-stored robot program generation software 20. The robot program generation software 20 is software that generates a robot program for a robot system including a robot, a peripheral device, a hand, a workpiece, a table, and the like. The robot program generation software 20 instantaneously generates a robot program with a typical arrangement pattern through a simple wizard operation. The CPU 11 loads the robot program generation software 20 from ROM 13 to RAM 12 and executes the loaded robot program generation software. In addition, the CPU 11 instructs the display unit 15, such as a liquid crystal display device, to display the output data. The CPU 11 also gives an instruction to prompt the user to enter input data via the input unit 16, such as a touch panel device and another instruction to make the communication controller 17 so transmit the generated robot program and the like to the robot control device (not illustrated).

The non-volatile memory 14 holds a plurality of types of pre-stored arrangement pattern data 21, a plurality of types of pre-stored peripheral device data 22, a plurality of types of pre-stored robot data 23, a plurality of types of pre-stored hand data 24, a plurality of types of pre-stored workpiece data 25, a plurality of types of pre-stored detailed task data 26, and the like. The arrangement pattern data 21 includes installation position data indicating where to install various arranged elements (a robot, a peripheral device, a table, a workpiece, and the like) arranged in a typical arrangement pattern. The installation position of each arranged element is defined as the position of the center of arranged element on the installation surface on which the arranged element is installed. The peripheral device data 22 includes three-dimensional shape data of various machine tools (for example, shape data of an injection molding machine, an electric discharge machine, a laser processing machine, and the like). The robot data 23 includes three-dimensional shape data of various industrial robots, and the hand data 24 includes three-dimensional shape data of various hands (e.g., shape data such as a suction hand, an electric hand, and the like). The workpiece data 25 includes three-dimensional shape data (e.g., a cube, a cylinder, a sphere, and the like) of various workpieces. The detailed task data 26 includes various workflows defined in advance according to the arrangement patterns, and various robot operation commands corresponding to their respective workflows. An exemplar workflow includes a task making a robot A respond to a door open signal by moving a workpiece D from a workpiece pick-up location where a peripheral device B exists to a workpiece drop-off location where a table C exists.

Figure 2A:
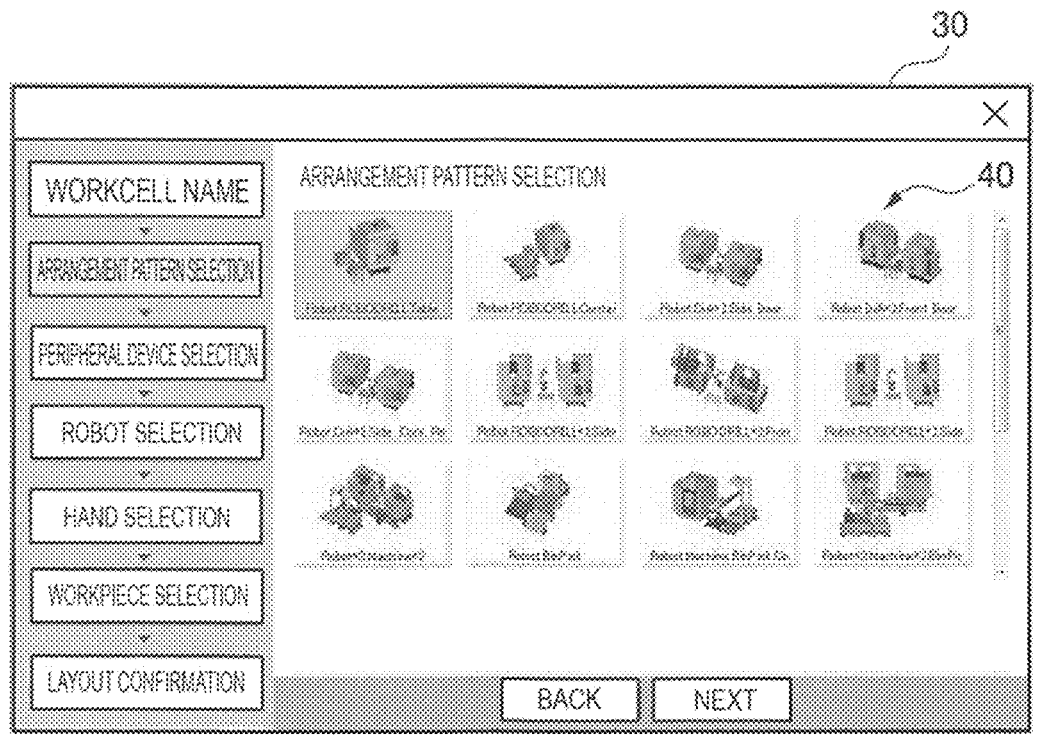
FIG. 2A is a selection screen for selecting an arrangement pattern according to one embodiment.
Figure 2B:
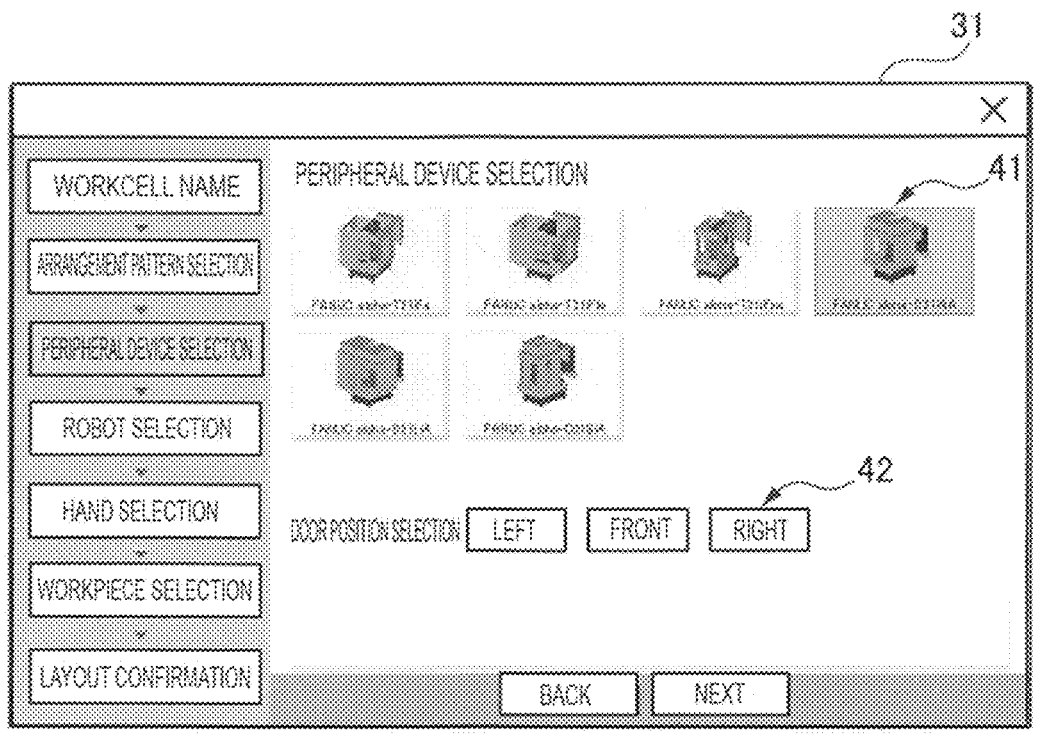
FIG. 2B is a selection screen for selecting a peripheral device according to one embodiment.
Figure 2C:
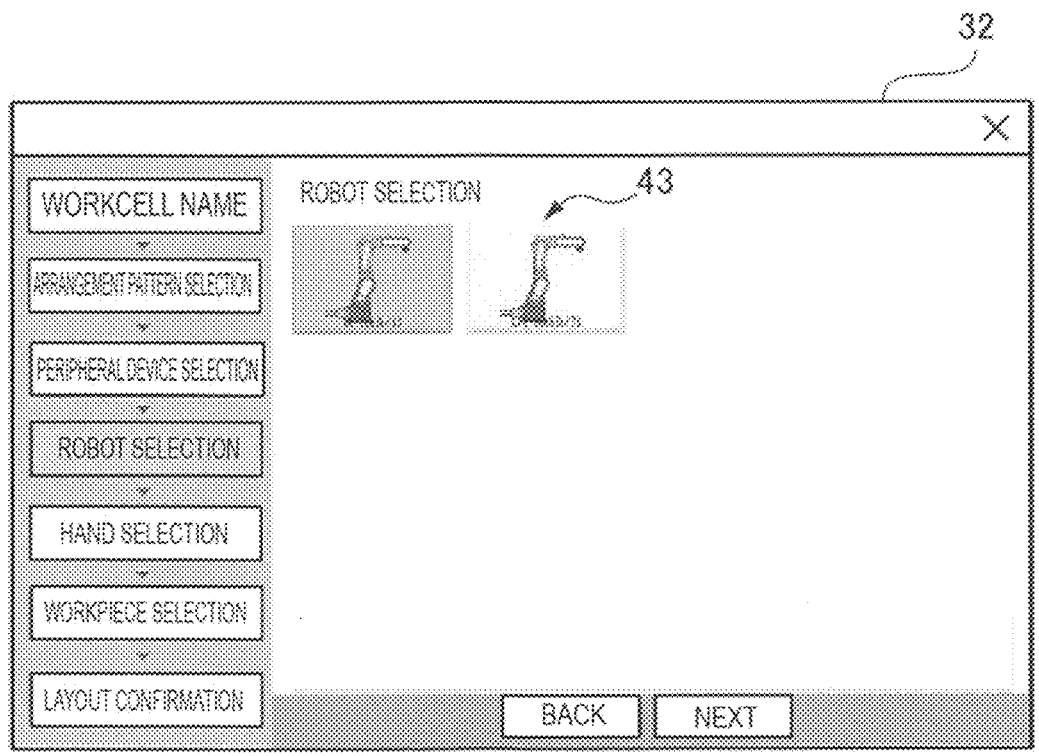
FIG. 2C is a selection screen for selecting a robot according to one embodiment.
Figure 2D:
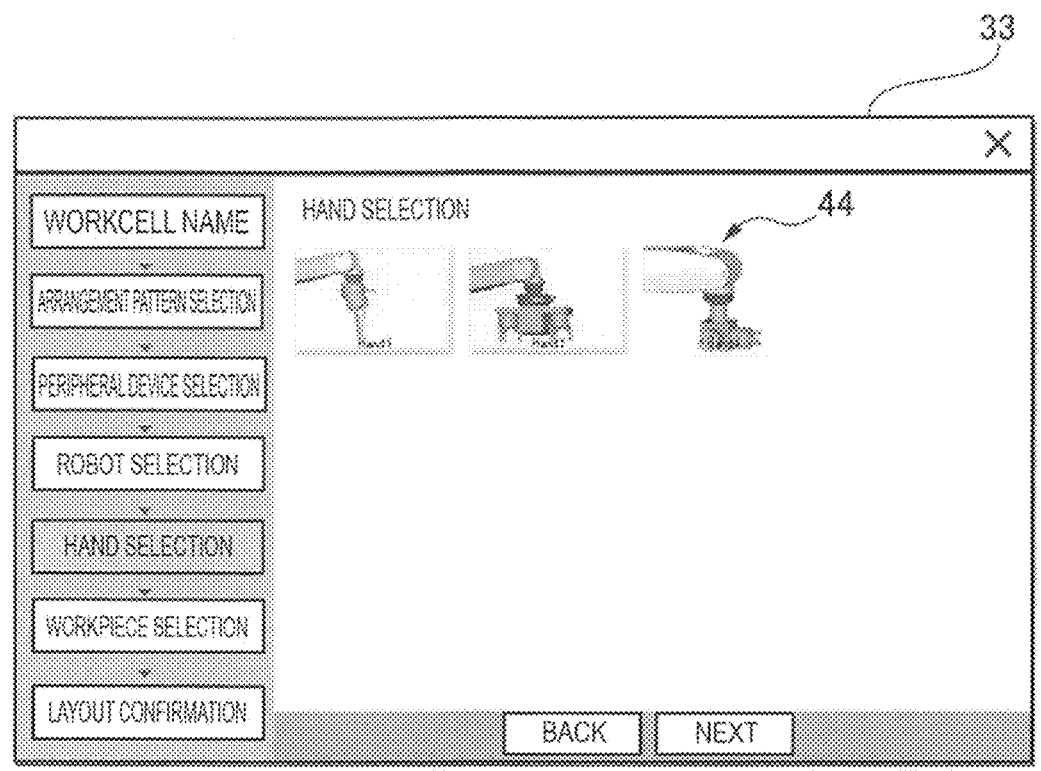
FIG. 2D is a selection screen for selecting a hand according to one embodiment.
Figure 2E:
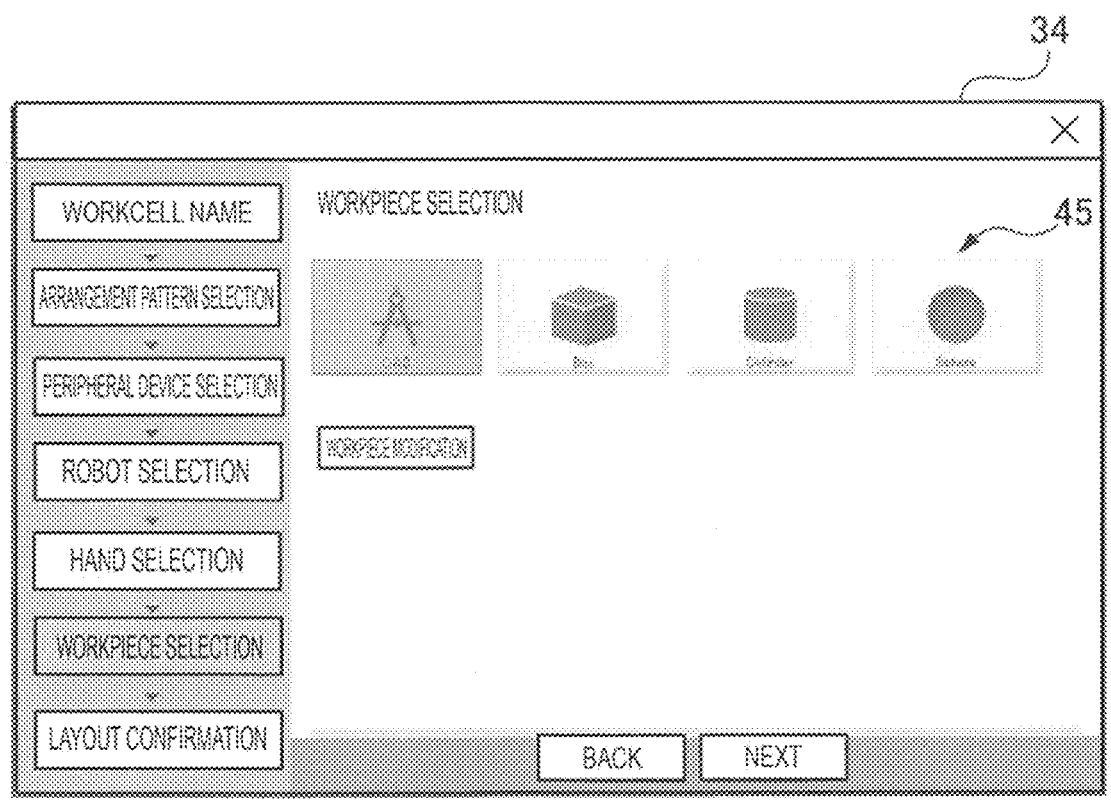
FIG. 2E is a selection screen for selecting a workpiece according to one embodiment.

FIGS. 2A to 2E illustrate wizard screens of a robot program generation software. FIG. 2A illustrates a selection screen 30 selecting an arrangement pattern for a robot system. The selection screen 30 of the arrangement pattern displays a plurality of selection buttons 40 depicting typical arrangement patterns. FIG. 2B illustrates a selection screen 31 of a peripheral device to be arranged in the selected arrangement pattern. The selection screen 31 of a peripheral device displays a plurality of selection buttons 41 depicting a plurality of types of peripheral devices, and a selection button 42 for selecting a door position of each peripheral device. FIG. 2C illustrates a selection screen 32 of a robot to be arranged in the selected arrangement pattern. The selection screen 32 of a robot displays a plurality of selection buttons 43 depicting a plurality of types of robots. FIG. 2D illustrates a selection screen 33 of a hand to be arranged in the selected arrangement pattern. The selection screen 33 of a hand displays a plurality of selection buttons 44 depicting a plurality of types of hands. FIG. 2E illustrates a selection screen 34 of a workpiece to be arranged in a selected arrangement pattern. The selection screen 34 of a workpiece displays a plurality of selection buttons 45 depicting a plurality of types of workpieces. The workpiece selection buttons 45 includes a selection button for selecting the workpiece CAD data and selection buttons for selecting one from typical workpiece shapes. In other embodiments, the robot program generation software may have a selection screen for selecting a table on which the workpiece is to be arranged.

FIG. 3 is a flowchart of robot program generation software. The robot program generation software performs the following steps to automatically generate the layout of the robot system and the robot program.

(Step S10) Select an arrangement pattern of the robot system from a plurality of typical arrangement patterns (see FIG. 2A).

(Step S11) Select arranged elements to be arranged in the selected arrangement pattern from a plurality of types of peripheral devices, a plurality of types of robots, a plurality of types of hands, and a plurality of types of workpieces (see FIGS. 2B to 2E).

(Step S12) Arrange the selected arranged elements in the virtual space.

(Step S13) Determine whether or not there is interference between the arranged elements in a stationary state. Various known techniques can be used for the interference determination.

(Step S14) In a case where there is interference between some arranged elements in an operating state (YES at Step S13), the installation positions of the arranged elements in the automatically generated layout are automatically modified. Specifically, the installation position of any of the interfering arranged elements (the robot, the peripheral device, the workpiece, the table, and the like) is moved to a new position where the moved arranged element does not interfere with any of the other arranged elements.

(Step S15) In a case where there is no interference with any arranged elements in the stationary state (NEC at Step S13), a robot program is automatically generated in accordance with the task details that depend on the selected arrangement pattern and the automatically generated layout. Specifically, for example, the generated robot program is one that makes the robot A move the workpiece D from the workpiece pick-up location where the table C exists to the workpiece drop-off location where the peripheral device B exists in response to the door open signal.

(Step S16) Execute the automatically generated robot program in a virtual space.

(Step S17) Determine whether or not there is interference between the robot in the operating state and any other arranged elements, or also determine whether or not the robot fails to reach the workpiece. In a case where the robot in the operating state does not interfere with any other arranged elements and in addition where the robot does not fail to reach (i.e., reaches) the workpiece (NO at Step S17), automatic generation of the layout and the robot program ends.

(Step S18) In a case where the robot in the operating state interferes with another arranged element or where the robot fails to reach the workpiece (YES at Step S17), the installation positions of the arranged elements in the automatically generated layout are automatically modified. The process then returns to Step S15 to correct (regenerate) the robot program based on the automatically modified installation positions.

Figure 4:
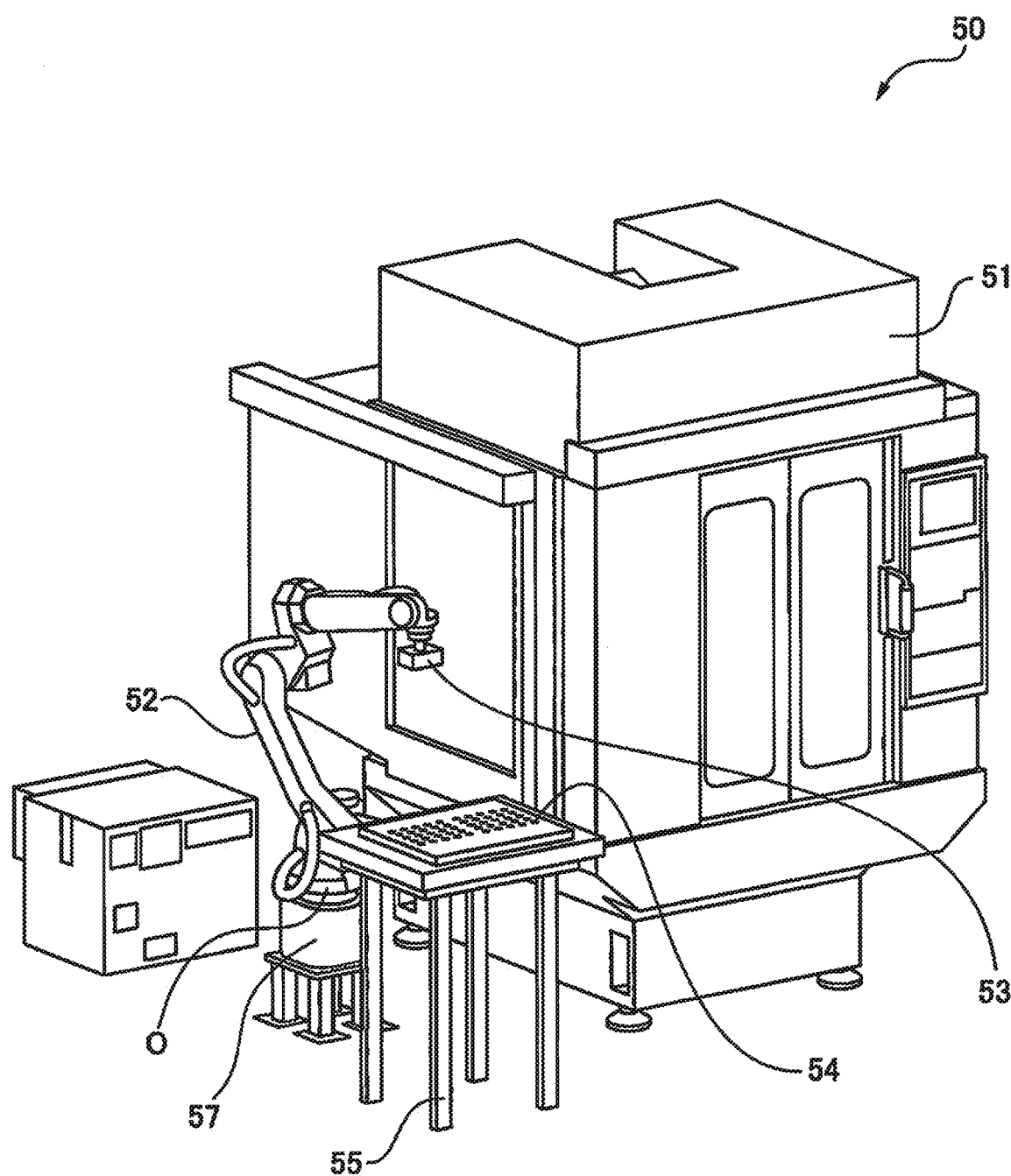
FIG. 4 is a display screen displaying a layout automatically generated according to one embodiment.

FIG. 4 is a display screen displaying an automatically generated layout 50. The layout 50 includes the installation position data of a peripheral device 51, a robot 52, a hand 53, a workpiece 54, and a table 55. The display screen of the layout 50 enables the robot system specifications to be easily examined in accordance with the user's demand, the environment, and the like. In addition, since a robot program of a typical layout is instantaneously generated through a simple wizard operation, the number of layout creation man-hours and the number of robot program creation man-hours are reduced.

Figure 5A:
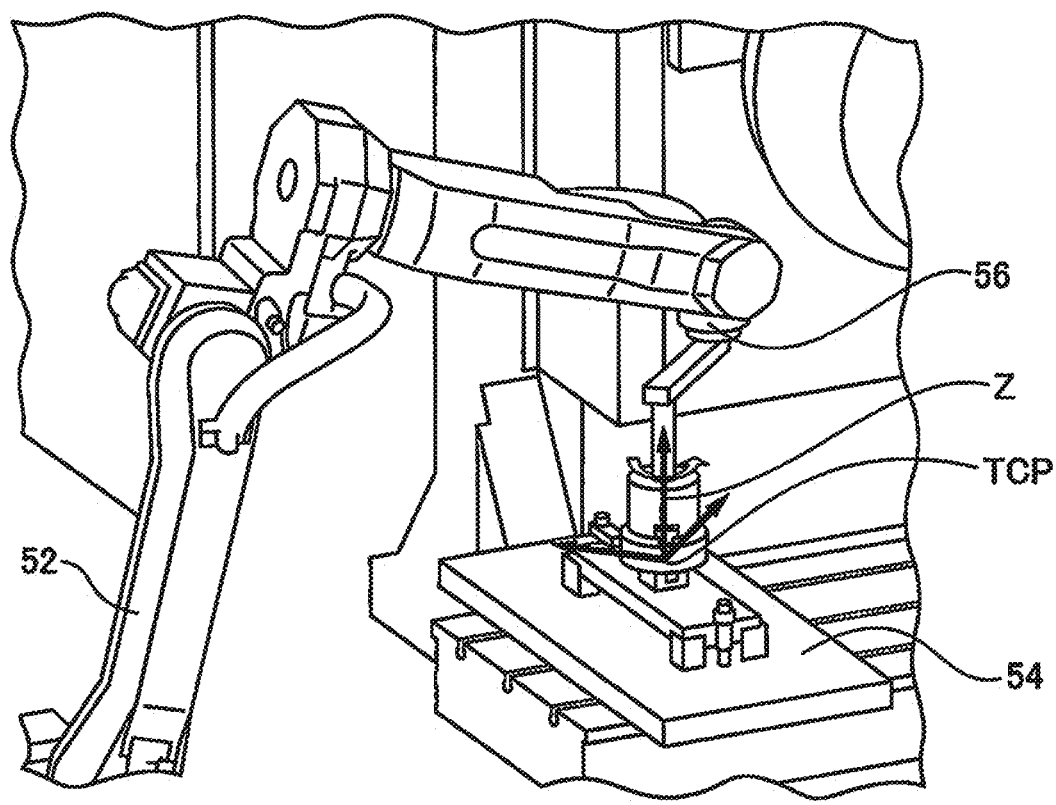
FIG. 5A is an explanatory diagram illustrating a procedure for determining a workpiece pick-up posture and a workpiece drop-off posture according to one embodiment.
Figure 5B:
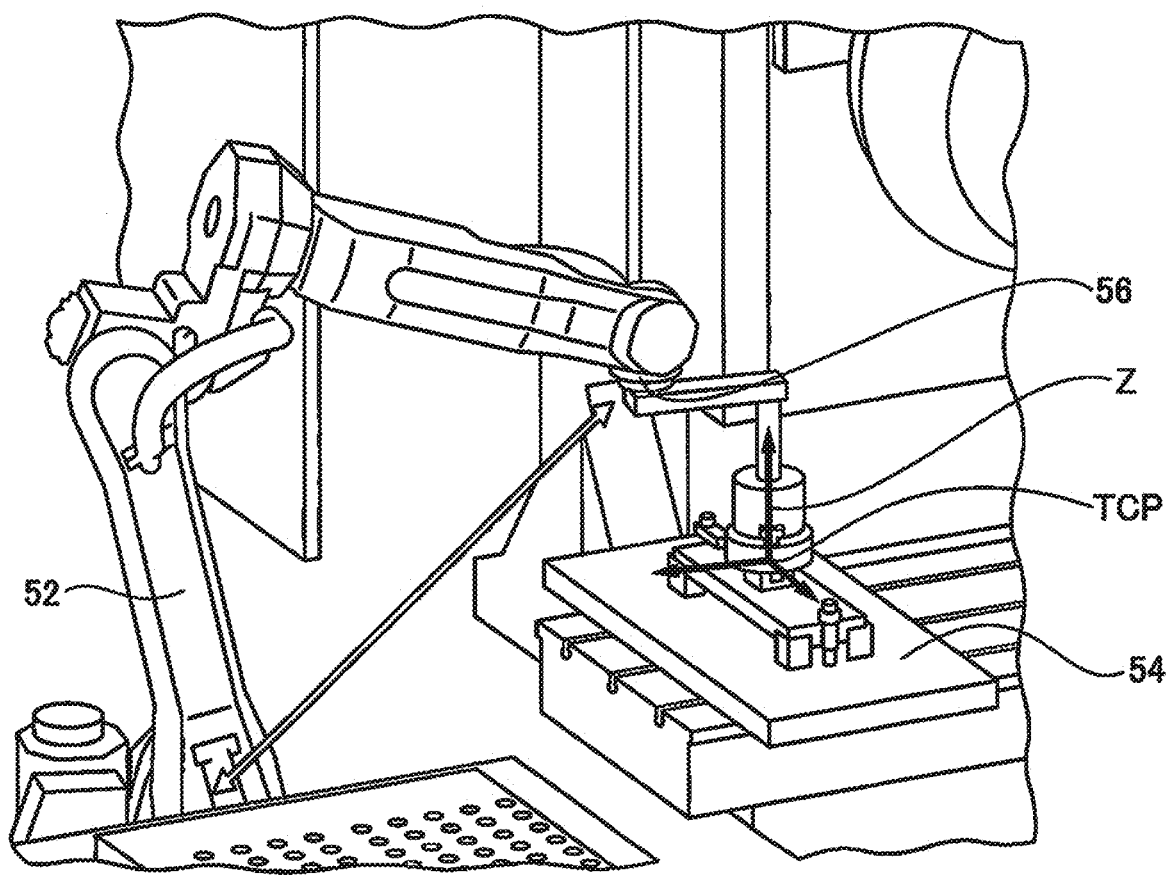
FIG. 5B is an explanatory diagram illustrating a procedure for determining a workpiece pick-up posture and a workpiece drop-off posture according to one embodiment.

FIGS. 5A and 5B are explanatory diagrams illustrating a procedure for determining the workpiece removal orientation and the workpiece drop-off posture. In a case where there is a certain degree of freedom in the workpiece removal orientation and the workpiece drop-off posture, the face plate 56 is moved (e.g., rotated) about an axis Z that passes on a preset tool center point (TCP) as Illustrated. In FIG. 5A. Then, the position of the face plate 56 relative to the workpiece 54 is determined as a workpiece removal orientation or a workpiece drop-off posture, where, as illustrated in FIG. 5B, the distance between the center position of the face plate 56 and the origin 0 set on a fixed base 57 of the robot 52 (see FIG. 4).

FIG. 6 is a flowchart for determining the workpiece removal orientation and the workpiece drop-off posture that are roughly described with reference to FIGS. 5A and 5B. The robot program generation software determines the workpiece removal orientation and the workpiece drop-off posture by performing the following steps.

(Step S20) Move the robot 52 to the workpiece pick-up location.

(Step S21) Move the face plate 56 of the robot. 52 about the axis Z that passes on the preset TCP. Determine a position of the face plate 56 relative to the workpiece 54, as the workpiece pick-up posture, where the robot 52 in the operating state does not interfere with any other arranged elements, and where the shortest distance is achieved between the center position of the face plate 56 and the origin 0 set on the fixed base 57 of the robot 52 (see FIG. 4).

(Step S22) Move the robot 52 to the workpiece dispensing position.

(Step S23) Move the face plate 56 of the robot 52 about the axis Z that passes on the preset TCP. Determine a position of the face plate 56 relative to the workpiece 54, as the workpiece drop-off posture, where the robot 52 in the operating state does not interfere with any other arranged elements, and where the shortest distance is achieved between the center position of the face plate 56 and the origin 0 set on the fixed base 57 of the robot 52.

By determining that the posture where the shortest distance is achieved between the center position of the face plate 56 and the origin 0 set on the fixed base 57 of the robot 52, an unnatural posture of the robot can be avoided, the cycle time can be optimized, and the robot program in which the interfering state is taken into account can be generated.

Figure 7:
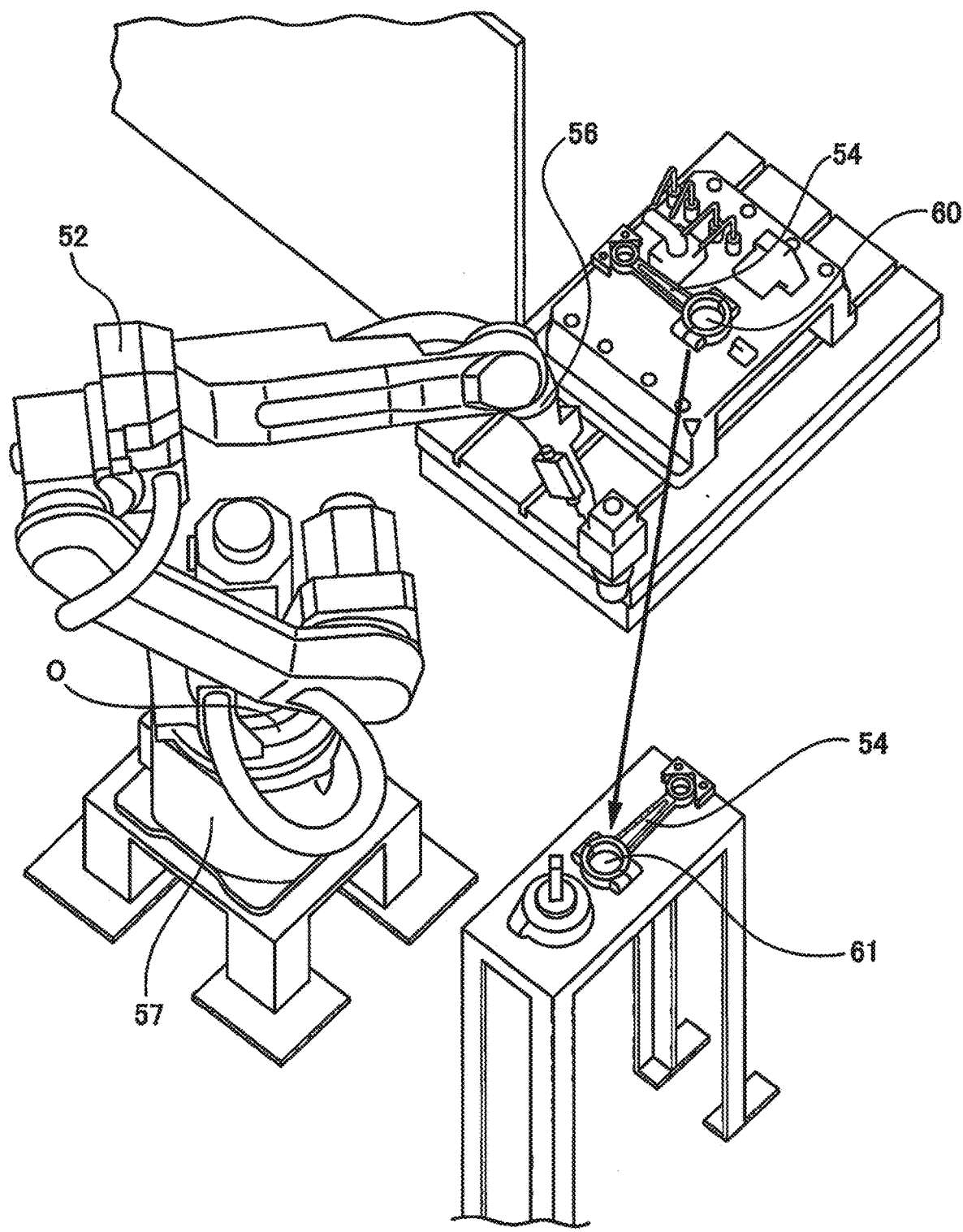
FIG. 7 is an explanatory diagram illustrating a procedure for determining a workpiece pick-up posture and a workpiece drop-off posture according to the other embodiment.

FIG. 7 is an explanatory diagram illustrating a procedure for determining a workpiece pick-up posture and a workpiece drop-off posture according to a different embodiment. Assume a case where the workpiece drop-off posture is predetermined. Move, in a virtual space, the face plate 56 at a workpiece pick-up location 60 about the axis Z that passes on the preset TCP, and set the position of the face plate 56 relative to the workpiece 54, as the workpiece pick-up posture, where the shortest distance is achieved between the center position of the face plate 56 and the origin 0 set on the fixed base 57 of the robot 52. Then, keep the robot 52 in the workpiece pick-up posture and move the robot 52 in the workpiece pick-up posture to a workpiece drop-off location 61 in the virtual space. In a case where the set workpiece pick-up posture does not suit to the predetermined workpiece drop-off posture, set another position of the face plate 56 relative to the workpiece 54, as the workpiece pick-up posture, where the second shortest distance is achieved between the center position of the face plate 56 and the origin 0 set on the fixed base 57 of the robot 52. Then, similar processing is repeated FIG. 8 is a flowchart for determining the workpiece pick-up posture and the workpiece drop-off posture that are roughly described with reference to FIG. 7. The robot program generation software determines the workpiece pick-up posture and the workpiece drop-off posture by performing the following steps.

(Step S30) Substitute 1 into the variable i (the variable i is an integer).

(Step S31) Move the robot 52 to the workpiece pick-up location 60 in the virtual space.

(Step S32) Move the face plate 56 of the robot 52 about the axis that passes on the preset TCP. Determine a position of the face plate 56 relative to the workpiece 54, as the workpiece pick-up posture, where the robot 52 in the operating state does not interfere with any other arranged elements, and where the i-th shortest distance is achieved between the center position of the face plate 56 and the origin 0 set on the fixed base 57 of the robot (Step S33) Keep the robot 52 in the set workpiece pick-up posture and move the robot 52 in the workpiece pick-up posture to the workpiece drop-off location 61 in the virtual space.

(Step S34) Add 1 to the variable i.

(Step S35) Determine whether or not there is interference between the robot 52 in the operating state and any other arranged elements, or determine whether or not the workpiece pick-up posture fails to suit the predetermined workpiece drop off posture. An allowable range may be predefined for determining the suitability. In a case where the robot interferes with any other arranged elements or where the workpiece pick-up posture fails to suit the predetermined workpiece drop-off posture (YES at Step S35), return the process to Step S31 to set another workpiece pick-up posture at the workpiece pick-up location 60. Then, repeat the similar processing (Step S31 to Step S35).

(Step S36) In a case where the robot does not interfere with any other arranged elements and in addition, where the workpiece pick-up posture does not fail to suit (i.e., suits) to a predetermined workpiece drop-off posture (YES at Step S35), determine the set workpiece pick-up posture as the workpiece pick-up posture.

By determining whether or not the set workpiece pick-up posture suits to the predetermined workpiece drop-off posture, the workpiece can be picked up in a reasonable posture without interference even in a case where the workpiece drop-off posture is predetermined.

The software for executing the processing described in the aforementioned flowchart may be recorded in and provided as a computer readable non-transitory recording medium, such as CD-ROM.

Although some embodiments have been described in this specification, the present invention is not intended to be limited to the above-described embodiments, and it is to be understood that many changes can be made without departing from the scope of the appended claims.

The invention claimed is:

1. A robot program generation apparatus for a robot system including at least a robot and a peripheral device, the robot program generation apparatus comprising:
a processor configured to:
   select a typical arrangement pattern of the robot system,
   individually select elements to be arranged in the selected arrangement pattern,
   automatically generate a layout where the arranged elements in a stationary state do not interfere with each other,
   automatically generate a robot program in accordance with task details corresponding to the selected arrangement pattern and with the automatically generated layout,
   execute the automatically generated robot program in a virtual environment, and automatically modify installation positions of the arranged elements in the automatically generated layout based on whether or not the robot in an operating state interferes with any other arranged elements and on whether or not the robot can reach a workpiece, and
   correct the robot program based on the automatically modified installation positions.

2. The robot program generation apparatus of claim 1, wherein the processor is further configured to:
   move, in a virtual space, a face plate of the robot at a workpiece pick-up location about an axis that passes on a preset tool-center point, and determine a position of the face plate relative to the workpiece, as a workpiece pick-up posture, where the robot in the operating state does not interfere with any of the arranged elements and where a shortest distance is achieved between a center position of the face plate and an origin set on a fixed base of the robot, and
   move, in a virtual space, the face plate at a workpiece drop-off location about the axis, and determine a position of the face plate relative to the workpiece, as a workpiece drop-off posture, where the robot in the operating state does not interfere with any of the arranged elements and where a shortest distance is achieved between a center position of the face plate and the origin set on the fixed base of the robot.

3. The robot program generation apparatus of claim 2, wherein, in response to the workpiece drop-off posture being predetermined, the processor is further configured to:
   move, in a virtual space, the face plate at the workpiece pick-up location about the axis, and set a position of the face plate relative to the workpiece, as the workpiece pick-up posture, where the robot in the operating state does not interfere with any of the arranged elements and where the shortest distance is achieved between the center position of the face plate and the origin set on the fixed base of the robot,
   move, in a virtual space, the robot to the workpiece drop-off location while the robot is kept in the set workpiece pick-up posture, and determine whether or not the robot in the operating state interferes with any of the arranged elements, and whether or not the workpiece pick-up posture suits to the predetermined workpiece drop-off posture, and
   determine the workpiece pick-up posture by repeating, at the workpiece pick-up location, processing to set again the workpiece pick-up posture in a case where the robot interferes with any of the arranged elements or where the set workpiece pick-up posture does not suit to the predetermined workpiece drop-off posture.

* * * * *